United States Patent [19]

Folwell et al.

[11] Patent Number: 5,473,754
[45] Date of Patent: Dec. 5, 1995

[54] BRANCH DECISION ENCODING SCHEME

[75] Inventors: Dale E. Folwell, Placentia; Ricke W. Clark, Irvine; Donald D. Harenberg, Placentia, all of Calif.

[73] Assignee: Rockwell International Corporation, Seal Beach, Calif.

[21] Appl. No.: 155,891

[22] Filed: Nov. 23, 1993

[51] Int. Cl.$^6$ ............................................. G06F 11/00
[52] U.S. Cl. ........................................ 395/183.21; 395/375
[58] Field of Search ................................. 395/575, 375

[56] References Cited

U.S. PATENT DOCUMENTS

| | | | |
|---|---|---|---|
| 3,673,573 | 6/1972 | Smith | 395/375 |
| 4,205,370 | 5/1980 | Hirtle | 364/200 |
| 4,453,093 | 6/1984 | Boudreau | 307/440 |
| 4,598,364 | 7/1986 | Gum | 371/19 |
| 4,821,178 | 4/1989 | Levin et al. | 395/575 |
| 5,121,489 | 6/1992 | Andrews | 371/19 X |
| 5,301,325 | 4/1994 | Benson | 371/19 X |
| 5,359,608 | 10/1994 | Belz | 371/19 X |

FOREIGN PATENT DOCUMENTS

| | | | |
|---|---|---|---|
| 0569987A1 | 11/1993 | European Pat. Off. | G06F 11/00 |
| 2200482 | 8/1988 | United Kingdom | G06F 11/28 |

OTHER PUBLICATIONS

Computer, vol. 26, No. 5, May 1993, Long Beach, pp. 52–61, "Efficient Program Tracing" by James R. Larus, University of Wisconsin.

Primary Examiner—Robert W. Beausoliel, Jr.
Assistant Examiner—Glenn Snyder
Attorney, Agent, or Firm—George A. Montanye; Charles T. Silberberg; Tom Streeter

[57] ABSTRACT

The BRANCH DECISION ENCODING SCHEME shown herein overcomes the limitations of a dedicated debug port on a single chip computer processor. A dedicated debug port resolves many of the problems associated with an add-on logic analyzer, except for its limitation of an eight bit data interface. The 8 bit port is required as a trade-off between the device I/O requirements and development tools. During real time program development, it is virtually impossible to monitor the 24 bit program counter through a port only a third as wide. The present invention solves this problem by taking advantage of the sequential characteristics of application programs. There is a discontinuity in the program counter in only a limited number of situations: branches, jumps, subroutine calls and returns from subroutines, exceptions and returns from exceptions, traps and return from traps, and loopbacks to the tops of loops. Therefore, by monitoring most of these discontinuities, it becomes possible to compress the 24 bit data so that it can be output through the 8 bit port in real time. For example, branch decisions can be defined by noting only that they occurred, and if they were taken or not taken, i.e., "1" or "0". The results of the decision tree are contained within the program and can be reconstructed in an external work station. To maintain synchronization, the absolute value of the program counter is updated periodically as the opportunity presents itself. It is always updated following indirect jumps.

5 Claims, 4 Drawing Sheets

BRANCH DECISION ENCODING SCHEME

BACKGROUND OF THE INVENTION

This invention relates to a means of verifying program flow within an inaccessible computer processor. It is incorporated in a debug port built within the internal logic of a single-chip, reduced instruction set, signal processor called the RSP device. It is used instead of a logic analyzer, since the device's internal program address bus is not available at its interface.

Heretofore, logic analyzers have been the primary tool used when trouble shooting digital computer hardware. However, with the advent of highly pipe-lined, single-chip processors having wide data and address buses, it becomes impractical to bring all necessary buses to the device's interface for hardware and program trouble shooting. Moreover, it is not possible to multiplex all of the data that one might find useful onto an output bus for this purpose when debugging in a real time program environment.

These problems will also be attendant in next generation devices which have limited external leads, use speeds approaching all physical limits, and where access is required to more and wider busses.

SUMMARY OF THE INVENTION

A debug port is incorporated in the RSP device as a hardware debugging and software development tool. It includes many of the features of commercial logic analyzers, but is included within the device's internal logic primarily because the very high speed performance characteristics of the device require that most operations be contained on a single silicon die. This means that a great deal of the functional operation of the device is internal and therefore no longer available to external development tools. Thus, key information within internal registers and memories is simply not available at the device's interface pins, and is not easily multiplexed out in a real time environment.

The debug port, however, has almost full access to all internal buses and can deliver out program flow data, as well as other information requested by the programmer and device designers. It does, however, impose a penalty in silicon area, but this area is expected to be less than 5% of the total area of the device.

The dedicated debug port resolves many of the problems associated with not being able to use an add-on logic analyzer, in that it permits input of trigger-capture conditions for capturing data on buses without disturbing the device's real-time processing; and, permits instructions to be injected into the device's instruction stream, which, e.g. can copy the contents of internal registers and memory locations to debug port registers for output.

However, the debug port does have a limitation of an eight bit wide data bus interface. The 8-bit port is a compromise between development tool and device input/output requirements. Because of this limitation, during real time program development, it is virtually impossible to monitor every state of the 24-bit program counter, that changes each instruction cycle, through a port only one-third as wide.

The present invention solves this problem by taking advantage of the sequential characteristics of application programs. Since discontinuities occur in the count of the program address counter in only a limited number of situations (i.e. branches, jumps, subroutine calls, returns from subroutines, exceptions, returns from exceptions, traps, returns from traps, and loopbacks to the tops of loops), the debug port takes advantage of this fact and captures program flow data only when certain discontinuities occur. As a result, output data is greatly reduced.

Further, all simple branches, i.e., those which have only one possible branch address, are encoded in a branch decision word either as a "1" or "0", since the next instruction executed after the branch and the delay slot instruction that always follows it, is either the instruction at a specified target address, or the instruction following the delay slot instruction. To maintain synchronization between the application and decompression programs, the 24-bit program address is output whenever the branch decision word is output.

The debug port delivers out compressed program flow, and other data over the above mentioned 8-bit bus. The bus extends to an interface module which then buffers the "bursty" high speed data to a lower rate. The lower rate data is then suitable for sending to the programmer's or device debugger's work station over a small computer system interface (SCSI) bus.

To understand how program flow address discontinuities are handled by the debug port's program flow unit, all their causes are listed in the 3-tables below.

TABLE 1

Instructions & Features That Cause Discontinuities Which Are Not Captured By Program Flow Unit

| Group A:<br>Target Address<br>Known | Group B:<br>Target Address<br>Known | Group C:<br>No Discontinuity<br>Occurs |
|---|---|---|
| Branch unconditional<br>Jump direct<br>Call direct<br>Trap direct | Automatic loopback to the top of a loop | Start loop direct or indirect<br>Halt |

TABLE 2

Instructions That Cause Discontinuities To Be Encoded In A Branch Decision Word

| | |
|---|---|
| Branch on conditon code | Branch on match register |
| Branch on register condition | Branch non-zero; post-modify |
| Branch on bit and toggle | Trap direct conditional |

TABLE 3

Instructions/Features That Cause Capture Of The Program Flow Address

| Group A:<br>Indirect<br>Instructions | Group B:<br>Exceptions/<br>Returns | Group C:<br>End of Loop | Group D:<br>Misc. |
|---|---|---|---|
| Jump indirect | Normal exception (when enabled by NEXCE) | Fall through at the end of a loop | Wait |
| Jump indirect, OR'd register address | Quick exception (when enabled by QEXCE) | | Break |
| Jump indirect, combined streamer address | Quick exception return (when enabled by QEXCE) | | |
| Jump indirect, OR'd register address, conditional | Quick exception return - signal (when enabled by QEXCE) | | |
| Jump indirect, combined | Normal exception/ | | |

TABLE 3-continued

| | Instructions/Features That Cause Capture Of The Program Flow Address | | |
|---|---|---|---|
| Group A: Indirect Instructions | Group B: Exceptions/ Returns | Group C: End of Loop | Group D: Misc. |
| streamer address, conditional | trap return | | |
| Jump thru table, OR'd register address | Call return | | |
| Jump thru table, combined streamer address | | | |
| Jump thru table, OR'd register address, conditional | | | |
| Jump thru table, combined streamer address, conditional | | | |
| Call indirect | | | |
| Trap indirect | | | |
| Trap indirect, conditional | | | |

First notice the titles assigned to the 3-tables, and then consider the left most column of Table 1. Each of the instructions in Group A of Table 1 always cause a discontinuity in the program address, to the target address specified in the branch, jump, call or trap instruction executed. Since the discontinuity always occurs, and the target address is part of the branch instruction and is known to the program that decompresses program flow data for the user, no program flow data is captured when any of these instructions are executed.

Now consider the automatic loopback feature included as Group B. When the instructions in an n-pass loop are executed, for the first n-1 passes there is always a discontinuity after the last instruction in the loop; back to the top of the loop. For the $n^{th}$ pass, the next instruction executed is always the next sequential instruction after the last instruction in the loop. Even though the next instruction executed after the last instruction in the loop is always predictable, the debug port's designers have chosen not to capture the program address when a looping to the top of a loop, but to capture the program address during the $n^{th}$ pass, when the next sequential instruction is fetched at the end of the loop, (see Table 3, the entry—fall through at the end of a loop).

Now consider the start loop instruction in Group C. A start loop instruction is used to define the top and length of a loop, and the number of passes before dropping through. Since a start loop instruction never causes a discontinuity immediately after its execution, (they occur at the bottom, after execution of the last instruction in the loop), no program flow data is captured when this instruction is executed.

The halt instruction is included in the RSP to save power when the device does not need to be active. Although it does not cause a jump in the program address, it does cause the program counter to stop advancing and the device to stop operating. Program flow data is not captured due to execution of the halt instruction.

The instructions in Table 2 are all conditional instructions. Execution of any of these instructions can cause a discontinuity (to a specified target address) if a certain condition is met; or cause the next sequential instruction to be executed, if the condition is not met. For these instructions, the debug port codes a branch decision word with a "1" if a discontinuity occurs, and a "0" if it does not occur.

The left-most column (Group A) of Table 3, lists all of the device's indirect instructions. When any of these instructions is executed a computed address is read from a specified register and used to fetch the instruction executed after a delay slot instruction. Since the target address is computed, and in most cases is not easily predicted, the program flow unit always captures the target address for these instructions when it is put on the program address bus.

The normal and quick exceptions that are listed in Group B of Table 3, occur due to signals generated by I/O units requesting service, and due to signals from arithmetic core units signaling the occurrence of errors.

When the RSP device responds to an exception signal from an I/O unit, it stops processing on its current task and jumps to an unrelated exception routine to possibly read data from an input register, or write data to an output register, before returning to finish the task. In signal processing applications input/output tasks usually must be performed periodically in order to prevent loss of data.

When the device responds to an exception signal from its arithmetic core, it also stops and jumps to an exception routine. But, the exception routine likely is used to perform a task related to the condition that caused the exception routine to be called, such as to correct the error, or notify an operator of its occurrence.

Since exception routines may be related, or unrelated, to the current task being performed, the programmer may find the program flow data less confusing if he/she can enable the capture of exception discontinuities in some situations (e.g. when determining if an arithmetic error is properly corrected), and disable their capture in others (e.g. when numerous I/O exceptions occur).

In the 2nd column of Table 3, NEXCE and QEXCE are the enables for capturing program discontinuities for normal and quick exceptions, respectively. Notice that QEXCE enables/disables the capture of program discontinuities both when entering and leaving quick exception routines, whereas NEXCE enables/disables their capture only when entering normal exception routines. In the RSP device, one instruction is used to command the return from both traps and normal exceptions. Because of this, the Debug Port's designers have chosen to always report discontinuities that occur when leaving normal exception routines, in order to avoid having separate instructions, one for returning from traps, and a second for returning from normal exceptions.

When the "automatic loopback to the top of a loop" feature was described above relative to Table 1, it was stated that program address discontinuities that occur when a loopback occurs to the top of a loop will not be reported, but the program address will be reported at the end of the loop when the processing for the loop is completed.

Neither the wait or the break instruction, in Group D of Table 3, cause the program address to change when they are executed; but they do cause the program counter to stop. A wait instruction is similar to the halt instruction in that it is used to save power. The wait instruction causes the arithmetic core's clocks to stop (leaving phase 1 on); but the I/O unit clocks are left running. The debug port will capture the program address when a wait instruction is executed.

A break instruction is used during program debugging to halt execution so that a number of register/memory locations can be examined to determine their values/states at that point in the program. The debug port also captures the program address when a break instruction is executed.

The debug port's program flow unit includes 6-essential registers. They are the 24-bit program address capture register (PAC); the 32-bit branch decision shift register (BDR); the 8-bit status register (STR); the 24-bit program address buffer (PAB); the 32-bit branch decision buffer (BDB); and the 8-bit status buffer (STB).

PAB, BDB and STB are buffer registers. They hold data copied from the PAC, BDR and STR registers, respectively, until the data can be multiplexed onto an debug port output bus, for transfer to the Debug Port's output fifo.

PAB always copies the current contents of the PAC register, just before the PAC register captures the address on the device's program address (PA) bus. The PAC register captures the program address when any of following occur:

1. An instruction is executed, or a condition occurs, that changes the program flow in an unpredictable manner.
2. The branch decision shift register (BDR) fills.
3. An input message specifies that the program address should be captured.

The copy/capture control logic for PAB and PAC receives seven inputs from neighboring logic. Five of the seven inputs are from the RSP device's instruction decode unit. These inputs are listed below in Table 4.

TABLE 4

Definition of Inputs to PAB/PAC Copy/Capture Control Logic

| Signal | Instruction/Condition Decoded |
|---|---|
| rtn_et | return from normal exception or trap |
| exc_sig | exception signal |
| qexc_sig | quick exception signal |
| rt_qk | return from quick exception/ return signal from quick exception |
| cp_pa | jump indirect/ jump indirect, OR'd register address/ jump indirect, combined streamer address/ jump indirect, OR'd register address, conditional/ jump indirect, combined streamer address, conditional/ jump through table, OR'd register address/ jump through table, combined streamer address/ jump through table, OR'd register address, conditional/ jump through table, combined streamer address, conditional/ call indirect/ trap indirect/ trap indirect, conditional/ return from subroutine call/ fall through at end of loop/ wait / break |

Table 4 shows which instructions or conditions cause each of the 5-signals to be asserted. These instructions/conditions are also listed in Table 3, and are the ones that cause the program flow to change in an unpredictable manner.

The two other signals that are input to the PAB/PAC control logic are shown later in Figure x.

Five signals, instead of one, are input by the PAB/PAC copy/capture control logic because some are also input as status signals by the STR register.

The STR register contains information about why a program address was captured, and if certain events have occurred since the last capture. Table 5 lists the meaning of the bits in the STR register; and, Table 6 expands on the meaning of the PFT bits in Table 5.

TABLE 5

STR Register Bit Definitions

| Bit # | Bit Name | Function |
|---|---|---|
| 7 | OW | Set if PAB overwritten before data output to FIFO |
| 6&5 | RC | Increments each time that PAR is loaded |
| 4 | DBIE | Set if DBI instruction executed since PAC loaded |
| 3 | QEO | Set if quick exception occurred since PAC loaded |
| 2 | NEO | Sel if normal exception occurred since PAC loaded |
| 1&0 | PFT | Indicates why program address captured |

TABLE 6

PFT Bit Definitions

| PFT1 | PFT0 | Cause of Proaram Flow Capture |
|---|---|---|
| 0 | 0 | Anything not listed below |
| 0 | 1 | A branch decision overflow or header |
| 1 | 0 | Normal or quick exception |
| 1 | 1 | Return from normal or quick exception or trap |

The BDR register is controlled by 2-inputs from the instruction decode unit. The signal, sbr_inst (simple branch instruction), causes BDR to left shift when any simple branch instruction is executed. The second signal, sbr_tkn (simple branch taken) is copied by the least significant bit of BDR, and is a "1" when the branch is taken, and a "0" when not taken.

The BDR register is initialized by the device power-on reset with bits 31-1 all "0's", and bit 0 equal to "1". It is re-initialized to this same state whenever its contents are copied by BDC. BDR is full when the lone "1", which was initialized into bit 0, is shifted out of bit 31.

Each time that a program flow capture occurs, the following happens:

1. The previous contents of PAC are copied into PAB.
2. The contents of BDR are copied into BDB.
3. The contents of STR are copied into STB.
4. BDR is re-initialized.
5. The RC (reference counter) bits in STR are incremented.
6. Either service request bd16.sr or bd32.sr is set to request time slots on the Debug Port's output bus, for movement of captured data to the output FIFO.

The 2-service request outputs, bd16.sr & bd32.sr, are used to indicate to the Debug Port's output bus arbitrator, whether any branch decision bits were previously shifted into the 16-most significant bits of BDR. If no bits were shifted into the upper half of BDR, then only the 16-least significant bits of BDB are copied to the output FIFO.

After program flow data is written into the output FIFO, it is then sent first to an Interface Module, and then to the hard-disk of a host work station. The work station decompresses the data from its hard disk and displays the resulting program flow addresses along with the program source code.

The bit numbers used in this description are by way of example only. Other register widths, bus widths, etc. could readily be designed to handle different configurations.

DESCRIPTION OF A PREFERRED EMBODIMENT

Figure 1:
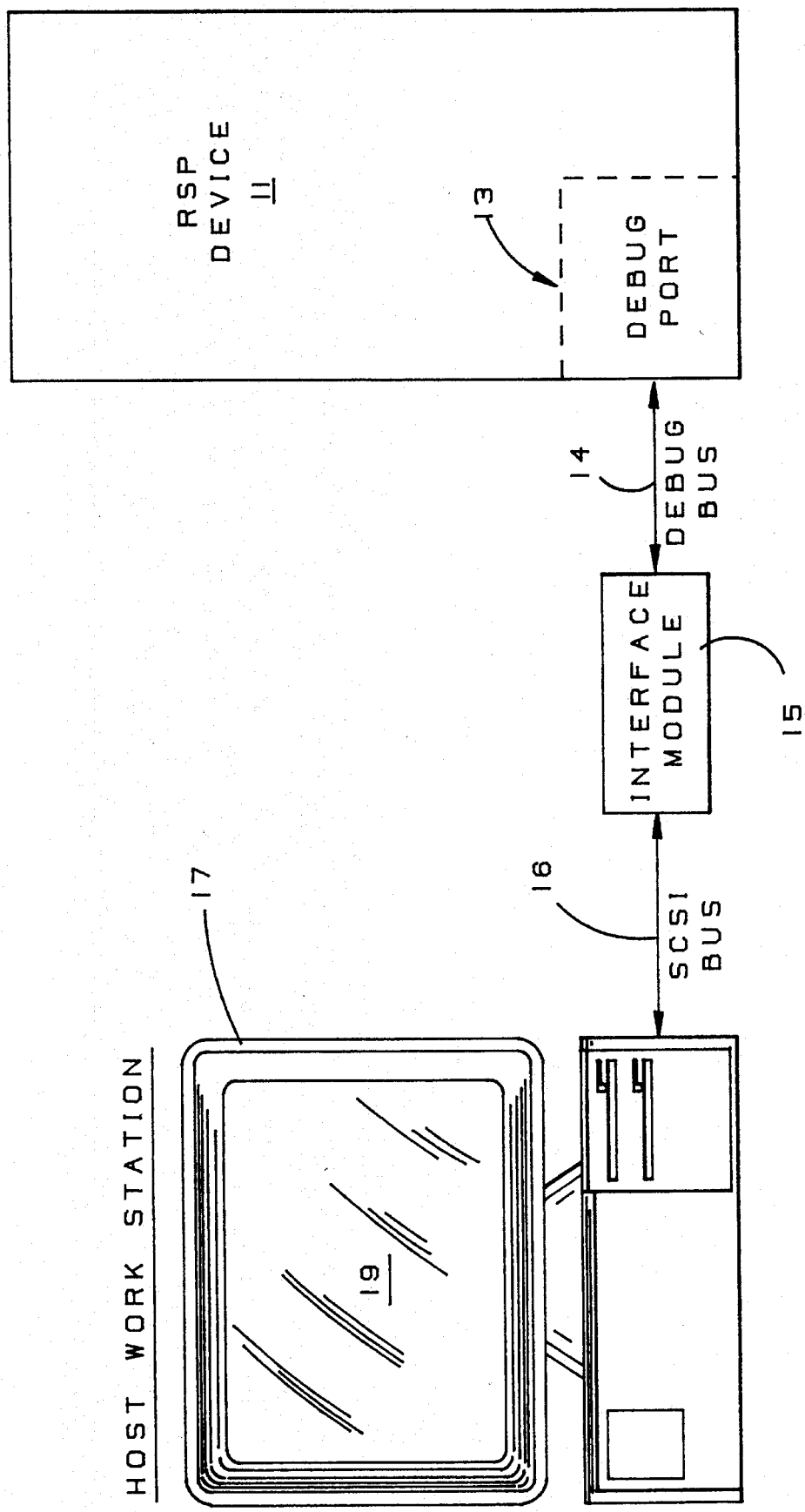
FIG. 1 shows, in block form, the debug port incorporated within the RSP device, with a connection leading to a host work station via an interface module and two connecting buses.

In FIG. 1, the RSP device is shown at 11, with the debug port within the RSP device, shown at 13.

Because of hardware limitations, it is not possible to capture and output every program address that occurs on the RSP's internal program address bus. Therefore, one primary function of the Debug Port is to encode and capture only the most necessary amount of program flow data, for transmission back to the programmer's host workstation.

In FIG. 1, the program flow data is sent to the programmer's workstation at 17, over the Debug Bus at 14, through the Interface Module at 15, and over the SCSI (small computer system interface) bus at 16.: After the program flow data is processed, the workstation attempts to display at 19, each program address and the programmer's source code corresponding to the addresses displayed, so he/she can determine if the program is functioning correctly.

Because programs can have several complex branch instructions, one right after another, it is possible that the Debug Port's Program Flow Unit will not be able to capture all necessary data for the workstation to completely reconstruct the program. When this occurs, the Program Flow Unit will mark an overwrite bit in an output status byte. When the reconstruction program sees the overwrite bit, it will show a discontinuity in the displayed data.

Figure 2:
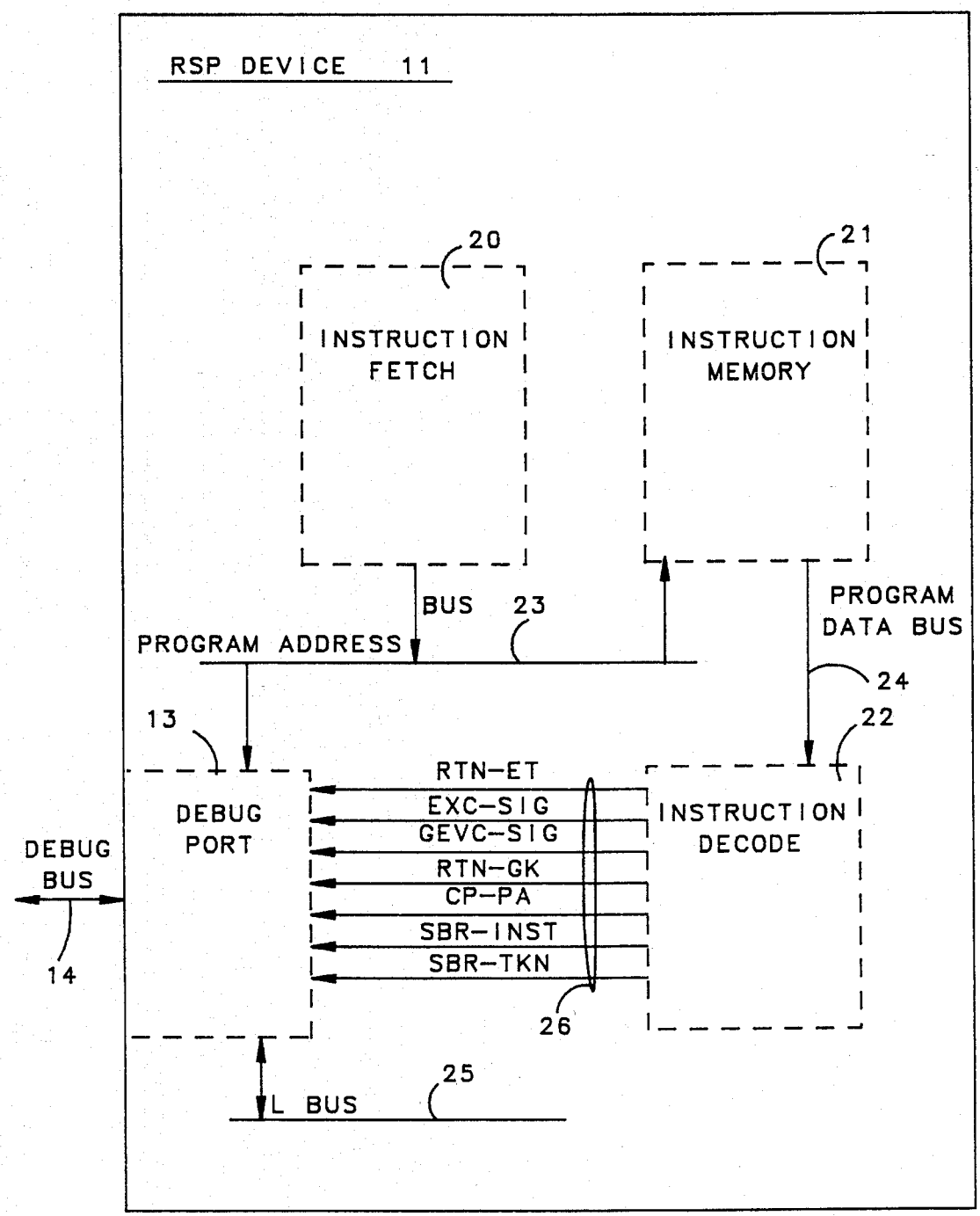
FIG. 2 shows the RSP device, with meaningful connections between the Debug Port, Instruction Fetch, Instruction Memory and Instruction Decode units.

FIG. 2 is provided to show the meaningful interfaces between the Debug Port and other RSP units, used when encoding and capturing program flow data. The Instruction Fetch Unit at 20 generates the address of the next instruction to be executed. This address is put on the Program Address Bus at 23, and used by Instruction Memory at 21, to fetch the next instruction. The Instruction Memory outputs the instruction on the Program Data Bus at 24. The Instruction Decode at 22, decodes the instruction and controls its execution in other units not shown. The Instruction Decode also decodes certain instructions for the Debug Port, and asserts the appropriate lines between the units, when these instructions are on the Program Data Bus. The L-bus at 25 is used for command and data transfer between the Debug Port and RSP core.

Figure 3:
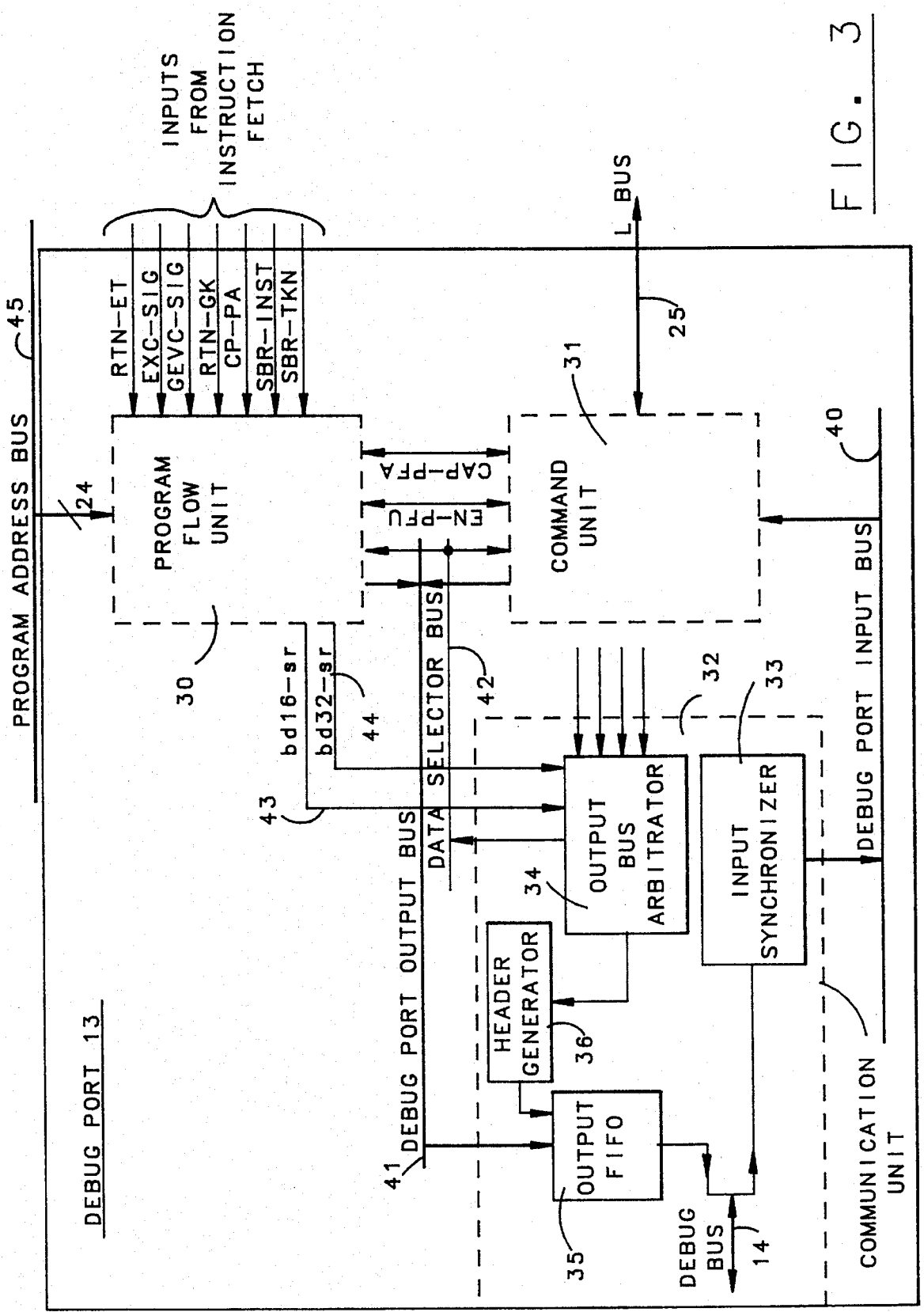
FIG. 3 shows the Debug Port, with meaningful inputs from external units, and meaningful connections between it's Communications, Command & Program Flow units.

FIG. 3 is provided to show the three units within the Debug Port that are involved in the program flow function.

Of the 3-units, the Command Unit at 31 is least involved. The Command Unit performs two functions. One, is the enabling/disabling of the Program Flow Unit via the en_pfu (enable program flow unit) line. The Command Unit receives enable and disable PFU commands either from the programmer via the Debug Port Input Bus at 40, the Input Synchronizer at 33, and the Debug Bus at 14; or from the RSP core (as a result of an instruction execution) on the L-bus at 25.

The Command Unit can also command the Program Flow Unit to capture program addresses at any time via the cap_pa line. It decodes capture program address commands that are input either from the programmer, or from the L-bus, via the same paths as the enable and disable PFU commands.

The Communications Unit at 32 is used both to input commands and data to the Debug Port, and to output program flow and other data. Since the Debug Bus is bi-directional, an output FIFO at 35 is included to store output data until the Interface Module at 15, in FIG. 1, is ready to accept it.

Because several data sources may want to copy data onto the Debug Port Output Bus at 41 simultaneously, the Communications Unit also includes an Output Bus Arbitrator at 34. Its purpose is to look at all asserted service requests and permit each access to the bus, one at a time. Permission to copy data on to the bus is granted via a 5-bit code written onto the Data Selector Bus at 42.

Figure 4:
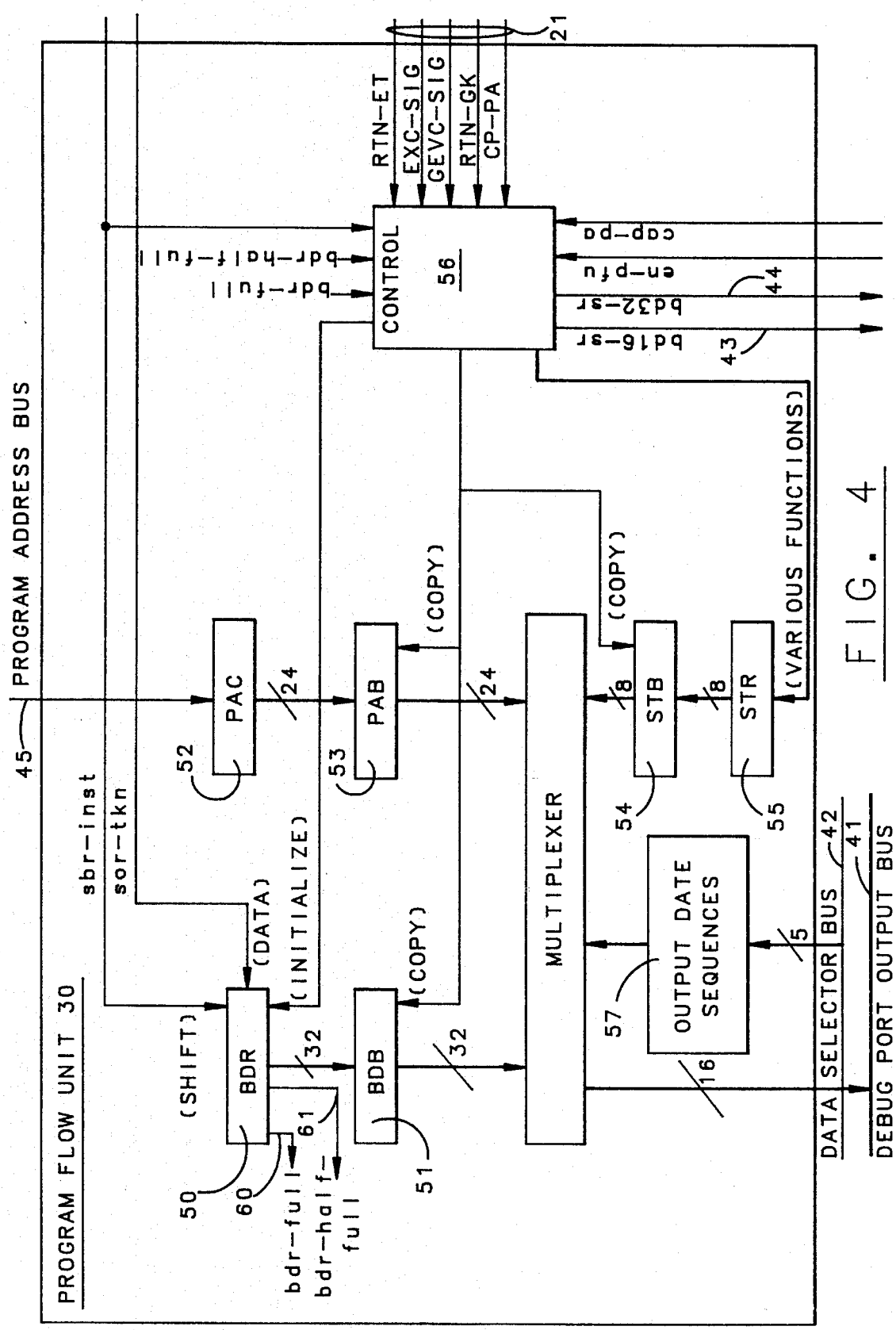
FIG. 4 shows the Debug Port's Program Flow Unit, with meaningful connections between its 6-registers, control logic, output data multiplexer, and output data sequencer.

FIG. 4 shows the Program Flow Unit itself. The BDR (Branch Decision shift Register) register at 50 is a 32-bit shift register that shifts left each time that its sbr_instr input is asserted. When it shifts, it copies the state of the sbr_tkn input. Thus, when a simple branch instruction (i.e. an instruction in Table 2) is executed, a "1" is encoded into the register when the branch is taken, and a "0" when not taken.

Since data would be lost if too many branch decisions are encoded, a means of detecting when BDR is full is provided. BDR is initialized with its left-most 31-bits at "0's", and its right-most bit at "1". When the initial "1" is detected at the bdr_full output at its left end at 60, the control logic at 56 then knows that 31-shifts have been performed, and its contents must be copied to BDB (Branch Decision Buffer) at 51. Although the most significant bit of BDR is never used for storing branch decisions, using this method precludes use of a counter to keep track of the number of shifts performed. And, since the contents of BDR can also be copied to BDB anytime, detection of the position of the initial "1" in the output data indicates how many branch decisions are included.

Since the contents of BDR can be copied to BDB anytime, a bdr_half_full tap at 61 is also provided to indicate if fifteen or fewer branch decisions have been encoded. When this is the case, then only the 16-least significant bits of BDR are sent to the workstation. Messages containing 16-bits of branch decision data are differentiated from those with 32-bits by the header which is prefixed to the message by the Header Generator at 36 in FIG. 3. The Program Flow Unit signals the data length to the Communication Unit at 32, by asserting either the bd16_sr or bd32_sr service request line at 43 or 44, when the BDB, PAB & STB buffers contain data for the host workstation.

The PAC (Program Address Capture) register at 52 is used to copy the program address from the Program Address Bus at 45 when an unpredictable discontinuity occurs in the program, (i.e. whenever any instruction or condition listed in Table 3 occurs).

The 5-inputs at 26, from the Instruction Decode Unit, are used to signal the occurrence of an unpredictable discontinuity. When any one of these inputs is asserted, the control logic first causes the current contents of PAC to be copied into PAB, the current contents of BDR to be copied into BDB, and the current contents of STR to be copied into STB; then causes PAC to copy the Program Address Bus. The control logic then asserts either bd16_sr, or bd32_sr, to signal that data is ready to be output on the Debug Port Output Bus.

The PAB, BDB and STB data is copied onto the Debug Port Output Bus under control of the Output Data Sequencer at 57 when either of two codes is detected on the Data Selector Bus. One code causes the sequencer to copy PAB, STB and both halves of BDB to the output bus, whereas the second code causes PAB, STB and only the lower half of BDB to be copied to the bus.

Since data will be output from the Program Flow Unit either because the BDR register becomes full, or because an unpredictable discontinuity occurs, the 8-bit status byte from STR at 55, is always output with the BDB and PAC data to indicate why the message is being output.

The STR register bits (which were described in Tables 5 & 6) also include an overwrite bit that indicates if the PAB buffer was overwritten before its data could be copied onto on the Debug Port Output Bus, and a 2-bit count that gets incremented each time that the PAC register copies a program address. The count indicates how many overwrites may have occurred.

While a particular embodiment has been described in some detail, the true spirit and scope of the present invention are not limited thereto, but only be the appended claims.

What is claimed is:

1. A method of compressing program address data, the method comprising the steps of:
   (a) encoding, in sequential order, each simple branch made and not made in the program, in bit-form data, regardless of how many times, if any, that the branch has been previously encoded;
   (b) copying, in sequential order, each unpredictable, program absolute address, in bit-form data, regardless of how many times, if any, that the program absolute address has been previously copied;
   (c) ignoring any program predetermined instructions; and
   (d) recording said bit-form data at a work station.

2. The method of claim 1, wherein said encoding is accomplished by supplying distinctive binary bits to a register indicative of whether or not the branch was taken.

3. The method of claim 2, further comprising the step of accumulating said bits for recordation at the work station as compressed program address data.

4. The method of claim 3, further comprising the step of accumulating the absolute new address in a further register whenever a signal is received for capture of program address data.

5. A method of compressing program address data for use in expediting the correction of program errors, the method comprising the steps of:
   (a) recording, in sequential order, at each opportunity for a branch to be taken, a compressed indicator indicating whether the branch was taken, regardless of how many times, if any, that the branch has been previously recorded;
   (b) recording a new address when, at a taken branch, the program jumps in a non-predetermined manner, regardless of how many times, if any, that the new address has been previously recorded.

\* \* \* \* \*